United States Patent
El Kadib et al.

(10) Patent No.: US 8,394,737 B2
(45) Date of Patent: Mar. 12, 2013

(54) PREPARATION OF ACTIVATING SUPPORTS

(75) Inventors: Abdelkrim El Kadib, Agadir (MA); Karine Molvinger, Montpellier (FR); Daniel Brunel, Montpellier (FR); Floran Prades, Linz (AT); Sabine Sirol, Horrues (BE)

(73) Assignees: Total Petrochemicals Research Feluy Seneffe, Feluy (BE); Centre National de la Recherche Scientifique, Paris (FR)

( * ) Notice: Subject to any disclaimer, the term of this patent is extended or adjusted under 35 U.S.C. 154(b) by 118 days.

(21) Appl. No.: 12/670,235

(22) PCT Filed: Jul. 16, 2008

(86) PCT No.: PCT/EP2008/059283
§ 371 (c)(1),
(2), (4) Date: Sep. 3, 2010

(87) PCT Pub. No.: WO2009/013197
PCT Pub. Date: Jan. 29, 2009

(65) Prior Publication Data
US 2011/0009582 A1   Jan. 13, 2011

(30) Foreign Application Priority Data

Jul. 24, 2007 (EP) .................................. 07290930

(51) Int. Cl.
C08F 4/02       (2006.01)
C08F 4/643      (2006.01)
C08F 4/6592     (2006.01)
B01J 31/22      (2006.01)

(52) U.S. Cl. ........ 502/232; 502/120; 502/152; 502/202; 526/130; 526/134; 526/160; 526/943

(58) Field of Classification Search .................. 526/130, 526/134, 160, 943; 502/120, 152, 202
See application file for complete search history.

(56) References Cited

U.S. PATENT DOCUMENTS 5,643,847 A * 7/1997 Walzer, Jr. .................... 502/117

* cited by examiner

Primary Examiner — Caixia Lu

(57) ABSTRACT

The present invention discloses a method for preparing an activating support and its use to activate metallocene or post-metallocene catalyst component for use in the oligomerization and polymerization of ethylene and alpha-olefins.

13 Claims, No Drawings

PREPARATION OF ACTIVATING SUPPORTS

CROSS-REFERENCE TO RELATED APPLICATIONS

This application claims the benefit of PCT/EP2008/059283, filed Jul. 16, 2008, which claims priority from EP 07290930.2, filed Jul. 24, 2007.

The present invention discloses the preparation of solid activating systems for the polymerisation of olefins. Particularly, the present invention relates to an activating support for immobilising metallocene or post-metallocene complexes, in order to promote heterogeneous polymerisation of ethylene and alpha-olefins.

The polymerisation of olefins in the presence of single site complexes has mostly been described in homogeneous catalysis. In that type of polymerisation, the catalyst, the olefin monomer and the resulting polymer are all present in the same liquid phase, typically a solvent.

These catalysts are however not adapted to heterogeneous polymerisation, such as suspension or gas phase polymerisation. These processes offer many advantages, among others, they allow the preparation of a polymer in granular form having a defined particles size distribution.

It is known in the art of homogeneous olefin polymerisation catalysis to use metallocene complexes or α-diimine or 2,6-bis(imino)pyridyl complexes of latetransition metal in combination with a selected activator. The most commonly used activating agent is alkylaluminoxane and most preferably methylaluminoxane (MAO) as it promotes high catalytic activity (see for example H. Sinn, W. Kaminsky, H. J. Wollmer, R. Woldt, "Living polymers" with Ziegler catalysts of high productivity "in Angew. Chem, 92, 396-402, 1980). That activating agent however also exhibits disadvantageous features such as superstoechiometric quantities of MAO ranging from MAO:catalyst precursor ratios of $10^2$:1 to $10^4$:1. Consequently, there is a great need to develop new activating agents that can either replace MAO or decrease its necessary quantities. (see for example E. Y.-X. Chen, T. J. Marks, "Cocatalysts for metal-catalyzed polymerization: Activators, Activation processes, and structure-activity relationships" in Chem. Rev., 100, 1391-1434, 2000). It has now been found that the propylene polymerisation activity of rac-ethylenebis(indenyl)methylzirconium cation stabilised by tetrakis(pentafluorophenyl)borate anion through reaction of rac-ethylenebis(indenyl)dimethylzirconium with trityl tetrakis(pentafluorophenyl)borate in the ratio 1:1 was six times greater than the activity of ethylenebis(indenyl)dichlorozirconium:MAO system with a ratio 1:2500 (J. C. W. Chien, W. M. Tsai, M. D. Rausch, "Isospecific polymerization of propylene catalyzed by rac-ethylenebis(indenyl)methylzirconium cation." J. Am. Chem. Soc., 113, 8570-1, 1991). In addition, it has a highest stereospecificity. The use of borane-based organic Lewis acid to activate metallocenes as polymerisation catalysts in homogeneous conditions has been studied by several groups, particularly to elucidate mechanism of arene-metal coordination (M. Bochman, A. J. Jaggar, J. C. Nicholls, "Base-free cationic 14-electron titanium and zirconium alkyls: in situ generation, solution structures, and olefin polymerization activity" in Angew. Chem. Int. Engl., 29, 780-782, 1990; X. Yang, C. L. Stern, T. J. Marks "Cation-Ike homogeneous olefin polymerization catalysts based upon zirconocene alkyls and tris-(pentafluorophenyl)borane" in J. Am. Chem. Soc., 113, 3623-25, 1991; M. Bochmann, S. J. Lancaster "Base-free cationic 14-electron alkyls of Ti, Zr and Hf as polymerisation catalysts: a comparison" in J. Organometallic Chem., 434, C1-C5, 1992; L. Jia, X. Yang, C. L. Stern, T. J. Marks, "Cationic metallocene polymerization catalysts based on tetrakis(pentafluorophenyl)borate and its derivatives. Probing the limits of anion "noncoordination" via a synthetic, solution dynamic, structural, and catalytic olefin polymerization study" in Organometallics, 16, 842-57, 1997; M. Vathauer, W. Kaminsky "Extremely active polymerizations of propene by bi-indenylzirconocenes and tetra(pentafluorophenyl)-borate" in Polymer, 42, 4017-24, 2001; M. J. Drewitt, M. Niedermann, R. Kumar, M. C. Baird "A study of representative alcohol, alkoxide, thiol and thiolate complexes of $B(C_6F_5)_3$; their roles as activators of zirconocene olefin polymerization initiators" in Inorg. Chimica Acta, 335, 43-51, 2002). The question of dormant sites has also been addressed (see for example C. L. Landis, D. R. Sillars, J. M. Batterton, "Reactivity of secondary metallocene alkyls and the question of dormant sites in catalytic alkene polymerization" in J. Am. Chem. Soc., 126, 8890-91, 2004). It has been shown that the active $(Cp_2$ alkylmetal$)^+$ species was directly formed by reaction of $Cp_2$dialkylmetal not only with $B(C_6F_5)_3$ or $[CPh_3]^+ [B(C_6F_5)_4]$, but also with $[HNMe_2Ph]^+ [BPh_4]$ (see for example the publications of Bochman et al. already cited hereabove). Another goal of this invention is the preparation of heterogeneous olefin polymerisation catalytic systems having hardened catalyst grains for use in gas phase or slurry polymerisation processes and then to provide a method for preparing polymers having improved morphology, thereby reducing reactor fouling (see for example E. M. Carnahan, G. B. Jacobsen "Supported metallocene catalysts" CATTECH, in Kluwer Academic/Plenum Publishers, vol 4; n° 1, 74-88, 2000; G. Fink, B. Steinmetz, J. Zechlin, C. Przybyla, B. Tesche, "Propene polymerization with silica-supported metallocene/MAO catalysts", in Chem. Rev., 100; 1377-90, 2000).

The heterogeneisation can optionaly be performed by the covalent anchorage of the metallocene complexes on mineral oxide supports as described for example in EP-A-293815, or in U.S. Pat. No. 5,262,498, or in U.S. Pat. No. 5,688,880, or in U.S. Pat. No. 5,854,362, or in U.S. Pat. No. 5,399,636 or in H. G. Alt, P. Schertl, A. Koppl, "Polymerization of ethylene with metallocene/methylaluminoxane catalysts supported on polysiloxane microgels and silica." in J. Organometal. Chem., 568, 263-269, 1998, or in M. Galan-Fereres, T. Koch, E. Hey-Hawkins, M. S. Eisen, Moris, "Synthesis and olefin polymerization using supported and non-supported geometry constrained titanium complexes." in J. Organometal. Chem. 580, 145-155, 1999. Similarly, the anchorage of post-metallocene complexes on mineral oxides has been disclosed for example in P. Preishuber-Pflugl, M. Brookhart, "Highly active supported nickel diimine catalysts for polymerization of ethylene" in Macromolecules, 35, 6074-6076, 2002, or in F. A. R. Kaul, G. T. Puchta, H. Schneider, F. Bielert, D. Mihalios, W. A. Herrmann, "Immobilization of bis(imino)pyridyliron(II) complexes on silica." In Organometallics, 74-82, 2002, or in I. Kim, B. H. Han, C.-S. Ha, J.-K. Kim, H. Suh, "Preparation of Silica-Supported Bis(imino)pyridyl Iron(II) and Cobalt(II) Catalysts for Ethylene Polymerization". In Macromolecules, 36, 6689-6691, 2003.

The catalyst component can also be deposited on polymer supports as described for example in T. R. Boussie, C. Coutard, H. Turner, V. Murphy, T. S. Powers, "Solid-phase synthesis and encoding strategies for olefin polymerization catalyst libraries" in Angew. Chem. Int. Engl., 37, 3272-75, 1998 or in T. R. Boussie, V. Murphy, K. A. Hall, C. Coutard, C. Dales, M. Petro, E. Carlson, H. W. Turner, T. S. Powers, "Parallel solid-phase synthesis, screening and encoding strategies for olefin polymerization catalysts" in Tetrahedron, 55, 11699-710, 1999 or in C. Liu, G. Jin, "Polymer-incorporated iron catalysts for ethylene polymerization-a new approach to immobilize iron olefin catalysts on polystyrene chains." in New J. Chem., 26, 1485-1489, 2002.

Another strategy concerns the covalent anchorage of dimethylanilinium cations on polymeric support which had to be achieved in order to allow immobilisation of the perfluorinated borate anions by ionic linkage as described in WO 98/55518 and in U.S. Pat. No. 6,228,795.

In parallel, Kaneko and Sato (U.S. Pat. No. 5,807,938) have anchored the p-trimethoxysily-(N,N-dimethylanilium) on a silica surface to afford an activated support for olefin polymerisation by addition of Li tetrakis(pentafluorophenyl)borate. They also claims the use of dimethyldimethoxysilane as co-grafting agent.

These catalytic systems using supported activators are less active than equivalent homogeneous systems and the polymer properties are thereby degraded.

A new generation of solid activating supports has been developed and is described for example in Marks (J. Am. Chem. Soc., 120, 13533, 1998): it concerns sulfated zircone particles or also by McDaniel (WO-9960033, WO-0123433, WO-0123434, WO-0144309, WO-0149747 et U.S. Pat. No. 6,548,441) or by Saudemont (FR-A-2765225). All these activators are solids having surface acid sites that are responsible for the activation.

These acid sites are metals combined with halides such as fluor or chlorine; metals can be selected from aluminium, titanium, zirconium or nickel.

The equivalent species in homogeneous catalysis are very poor activating species.

Compounds such as dimethylaluminium fluoride (DMAF) are used as activators in combination with triethylaluminium for the stereospecific polymerisation of propylene with compounds of the metallocene family with low productivity as described by Zambelli (*Macromolecules* 1989, 22, 2186). They do not activate metallocene complexes.

There is thus a need to develop new activating supports efficient in producing active single site catalyst systems and that do not require the use of methylaluminoxane.

It is an aim of the present invention to prepare new species of activating support.

It is another aim of the present invention to prepare very active single site supported catalyst systems that do not require the use of methylaluminoxane.

It is also an aim of the present invention to prepare polymers that have regular grain size.

Any one of these aims is at least partially fulfilled by the present invention.

Accordingly, in a first embodiment, the present invention discloses a method for preparing an activating support that comprises the steps of:

a) providing a support prepared from silica or from mixed mineral oxides based on silica;

b) grafting on the surface of the support of step a) a mixture of silylating agents comprising a functionalised silylating agent of formula $Y_3Si-L-NR'_2$ wherein each R' is independently selected from alkyl, aryl, alkylaryl or arylalkyl, and a structurally similar non functionalised silylating agent $Y_3Si-L$, said functionalised and non functionalised silylating agents being in a ratio ranging between 1:1 and 1:19 and wherein each Y is independently selected from alkoxy, halogen or hydrogen and wherein L is a rigid linker group, preferably an aromatic group and more preferably a phenyl group

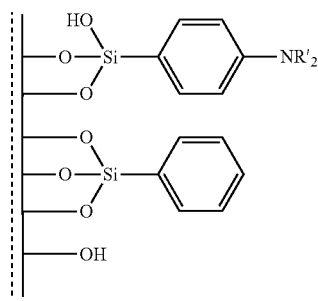

c) adding to the intermediate support of step b) a non-nucleophile trimethylsilylating agent selected from trimethylphenoxysilane, phenyldimethylphenoxysilane, hexamethyldisiloxane, 1,1,3,3-tetramethyldisiloxane, trimethylsilyl methanesulfonate, trimethylsilyl trifluoromethanesulfonate, trimethylsilyl-p-toluenesulfonate, hexamethyldisilazane, N,N-bis(trimethylsilyl)urea, N,O-bis(trimethylsilyl)acetamide, N-trimethylsilyl acetamide, N-methyl-N-trimethylsilyltrifluoroacetamide, N-trimethylsilylimidazole, N-trimethylsilylthiazole; N-trimethylsilyloxazole or trialkylhalogensilanes such as trimethylchlorosilane, triethylchlorosilane, tri-n-propylchlorosilane, tri-i-propylchlorosilane, tri-n-butylchlorosilane, tri-i-butylchlorosilane, tri-s-butylchlorosilane, t-butyldimethyl chlorosilane, cyclohexyldimethylchlorosilane, dicyclohexylmethylchlorosilane, tricyclohexylchlorosilane, phenyldimethylchlorosilane or N,O-bis(trimethylsilyptrifluoroacetamide, preferably N,O-bis(trimethylsilyl) trifluoroacetamide in order to passivate the residual silanol or silane-silanol groups leading to intermediate support S

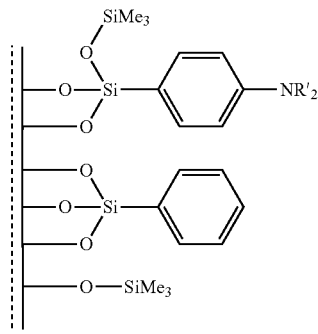

d) protonating the intermediate amine-grafted supports of step c) with an acid AH in order to form the protonated intermediate supports

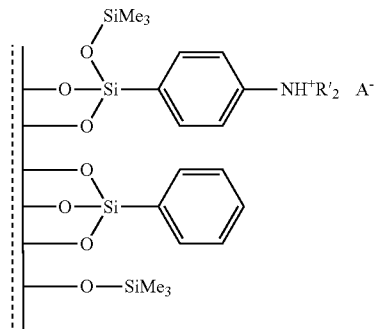

wherein A is triflate $CF_3SO_2O$ (OTf) or halogen;

e) adding a borate or aluminate XM to the intermediate support of step d) wherein X is Al- or B-containing activating group and M is a metal Group 1 of the Periodic Table, in order to provide activating support $S_{act}$

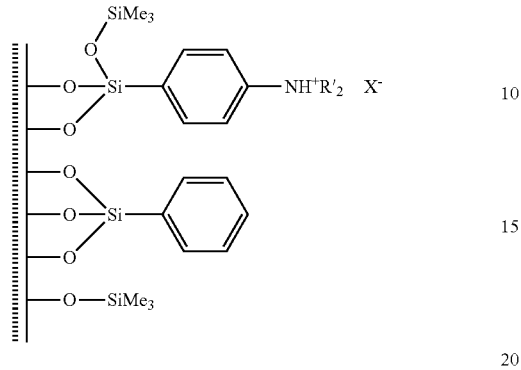

with release of MA f) retrieving an activating support.

In a second embodiment, the present invention discloses a method for preparing an activating support that comprises the steps of:

a) providing a support prepared from silica or from mixed mineral oxides based on silica;

b) grafting on the surface of the support of step a) a mixture of silylating agents comprising a functionalised silylating agent of formula $Y_3Si$-L-$CH_2$—Z and a structurally similar non functionalised silylating agent $Y_3Si$-L, said functionalised and non functionalised silylating agents being in a ratio ranging between 1:1 and 1:19 and wherein each Y is independently selected from alkoxy, halogen or hydrogen, L is a rigid linker group and Z is a leaving group, in order to prepare modified support

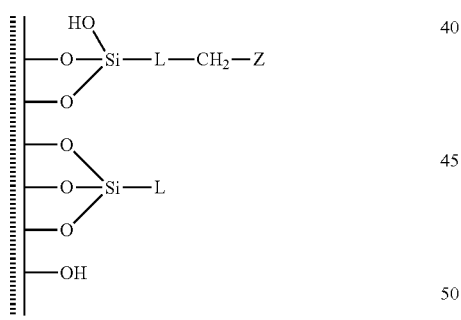

c) adding to the modified support of step b) a non-nucleophile trimethylsilylating agent selected from trimethylphenoxysilane, phenyldimethylphenoxysilane, hexamethyldisiloxane, 1,1,3,3-tetramethyldisiloxane, trimethylsilyl methanesulfonate, trimethylsilyl trifluoromethanesulfonate, trimethylsilyl-p-toluenesulfonate, hexamethyldisilazane, N,N-bis(trimethylsilyl)urea, N,O-bis(trimethylsilyl)acetamide, N-trimethylsilyl acetamide, N-methyl-N-trimethylsilyltrifluoroacetamide, N-trimethylsilylimidazole, N-trimethylsilylthiazole, N-trimethylsilyloxazole or trialkylhalogensilanes such as trimethylchlorosilane, triethylchlorosilane, tri-n-propylchlorosilane, tri-i-propylchlorosilane, tri-n-butylchlorosilane, tri-i-butylchlorosilane, tri-s-butylchlorosilane, t-butyldimethyl chlorosilane, cyclohexyldimethylchlorosilane, dicyclohexylmethylchlorosilane, tricyclohexylchlorosilane, phenyldimethylchlorosilane or N,O-bis(trimethylsilyl)trifluoroacetamide, preferably N,O-bis(trimethylsilyl)trifluoroacetamide of formula

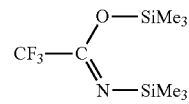

to passivate the residual silanol or silane-silanol groups leading to intermediate support

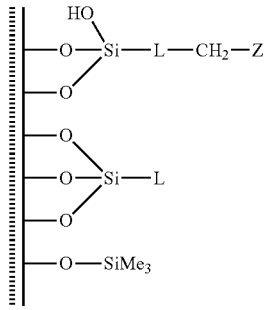

with release of CF3-C(O)NH2 and wherein the amount of trimethylsilylating agent is selected to provide at least 5 equivalents of silanol with respect to the silanol present in the starting silica-based support of step a);

d) adding to the passivated support of step c) a secondary amine of formula

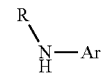

wherein R is alkyl group having from 1 to 6 carbon atoms or substituted or unsubstituted aryl group and Ar is substituted or unsubstituted aryl group, in order to provide intermediate support

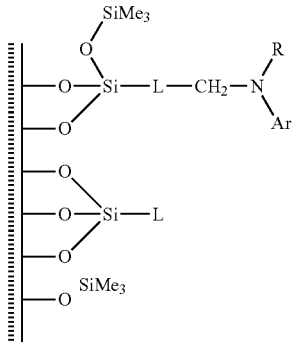

with release of ZH d) protonating the intermediate amine-grafted supports of step c) with an acid AH in order to form the protonated intermediate supports

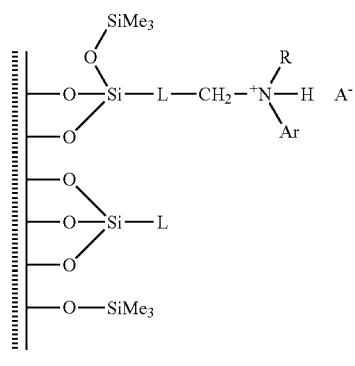

wherein A is triflate $CF_3SO_2O$ (OTf) or halogen;
f) adding a borate or aluminate XM to the intermediate support of step d)
wherein X is Al- or B-containing activating group and M is a metal Group 1 of the Periodic Table, in order to provide activating support $S_{act}$

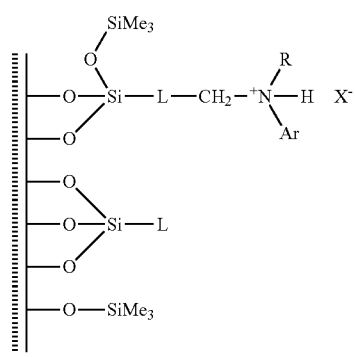

with release of MA
g) retrieving an activating support.

The support is preferably selected from $SiO_2$, $SiO_2/Al_2O_3$, $SiO_2/TiO_2$, $SiO_2/ZrO_2$, $SiO_2/LnO_x$ wherein Ln stands for lanthanides.

Preferably, R' is alkyl group having from 1 to 6 carbon atoms or aryl group. More preferably, R' is methyl, butyl or phenyl. Most preferably it is phenyl.

Linker group L is preferably phenyl group =—$C_6H_4$—

At least one of R' and L must be aryl group.

Leaving group Z is preferably selected from halogen, para-toluenesulfonate, triflate and diazonium.

X is preferably selected from tetrakis-(pentafluoroaryl) borate or tetrakis-(pentafluoroaryl)aluminate.

Preferably M is lithium.

The support can also be modified in order to tailor its characteristics such as its specific surface area, its pore volume, its acidity or its hydrophobic or hydrophilic character.

Preferably, in the first embodiment according to the present invention the method for preparing an activating support comprises the steps of:
a) providing a support selected from $SiO_2$, $SiO_2/Al_2O_3$, $SiO_2/TiO_2$, $SiO_2/ZrO_2$, $SiO_2/LnO_x$;
b) grafting on the surface of the support of step a) a mixture of para-aminophenylsilane and of phenylsilane chains in a ratio ranging from 1:1 to 1:19;
c) N-alkylating the amino-groups of the support of step b) in order to prepare an intermediate support bearing grafted para-N,N-dialkyl-aminophenylsilane and phenylsilane in a ratio ranging from 1:1 to 1:19

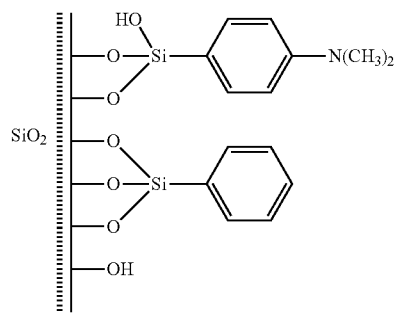

d) adding to the intermediate support of step c) a trimethylsilylating agent such as for example trimethylsilylimidazole or hexamethyldisilazane

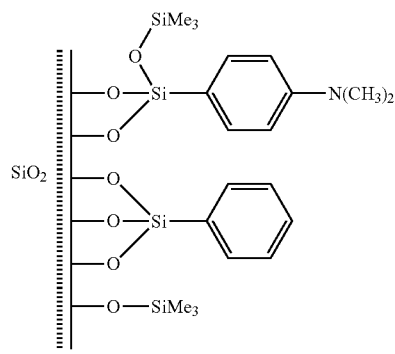

wherein the amount of trimethylsilylating agent is selected to provide at least 5 equivalents of silanol with respect to silanol present in starting silica-based support;
e) prtonating the intermediate amine grafted support of step d) with an acid AH to

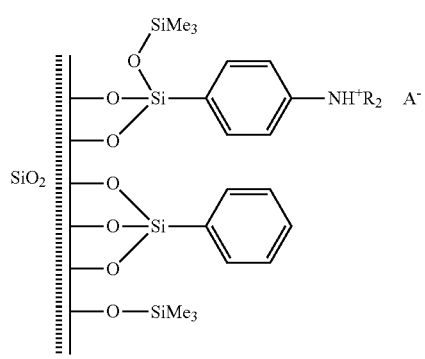

form the protonated intermediate support
wherein A is Otf or halogen;
f) adding a borate or aluminate XM to the intermediate supports of step e) wherein X is an activating group containing $Al^-$ or $B^-$, and M is a metal Group 1 of the Periodic Table, in order to provide activating support

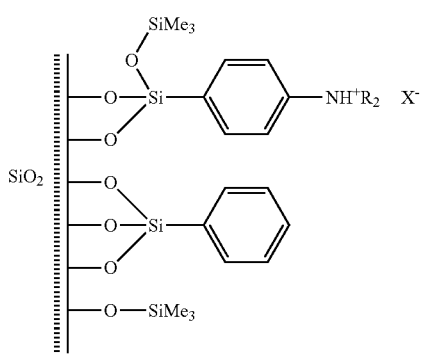

with release of MA;

g) retrieving an activating support.

Preferably, in the second embodiment according to the present invention the method for preparing an activating support comprises the steps of:

a) providing a support selected from $SiO_2$, $SiO_2/Al_2O_3$, $SiO_2/TiO_2$, $SiO_2/ZrO_2$, $SiO_2/LnO_x$;

b) grafting on the surface of the support of step a) a functionalised silylating agent of formula $(RO)_3Si$—Ar—$CH_2$—X or a mixture of silylating agents comprising a functionalised silylating agent of formula $(RO)_3Si$—Ar—$CH_2$—X and a structurally similar non functionalised silylating agent $(RO)_3Si$—Ar, being in a ratio ranging between 1:1 and 1:19 and wherein OR is an alkoxy group, Ar is an aromatic group, preferably a phenyl ring and X is an halogen, in order to prepare modified support

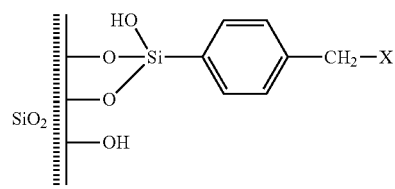

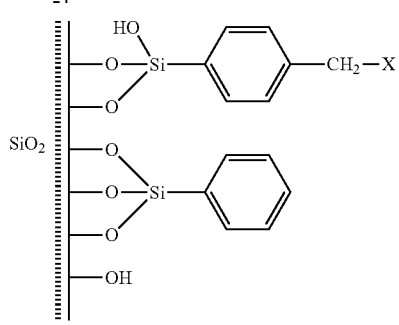

c) adding to the modified supports of step e) a non-nucleophile trimethylsilylating agent of formula

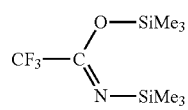

to provide passivated supports

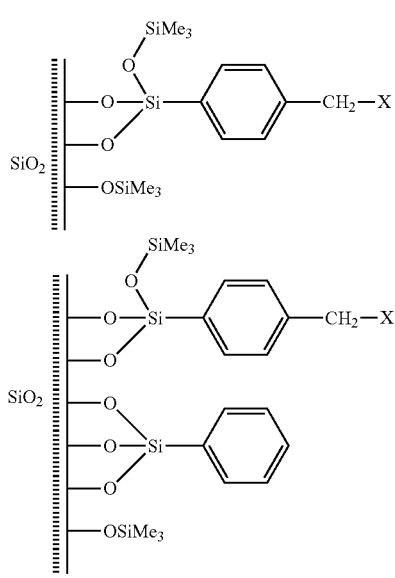

wherein the amount of trimethylsilylating agent is selected to provide at least 5 equivalents of silanol with respect to silanol present in the starting silica-based support of step a);

d) adding to the passivated supports of step e) a secondary amine of formula

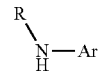

wherein R is alkyl group having from 1 to 6 carbon atoms or substituted or unsubstituted aryl group, preferably an alkyl group and Ar is an aromatic group in order to provide intermediate supports

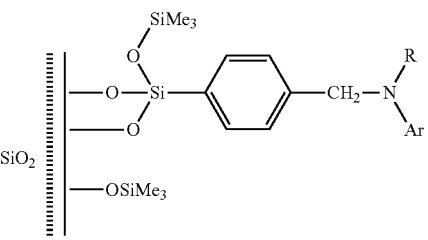

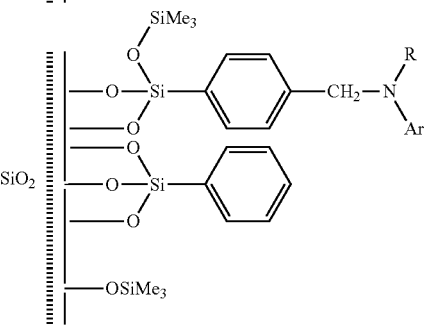

e) protonating the intermediate amine-grafted supports of step d) with an acid AH to form protonate intermediate supports

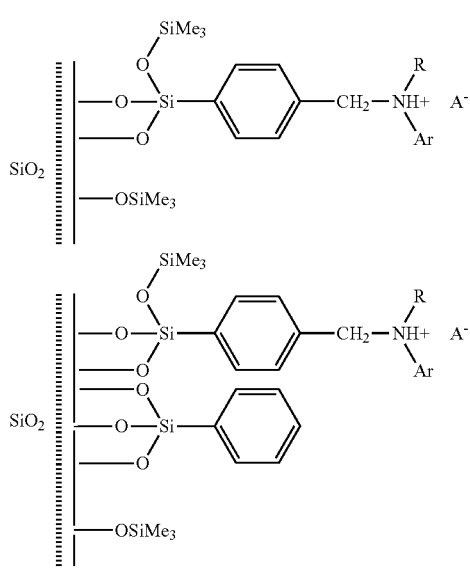

wherein A is OTf or halogen f) adding a borate or aluminate: XM to the intermediate supports of step e) wherein X is an activating group containing Al⁻ or B⁻, and M is a metal Group 1 of the Periodic Table, in order to provide activating support

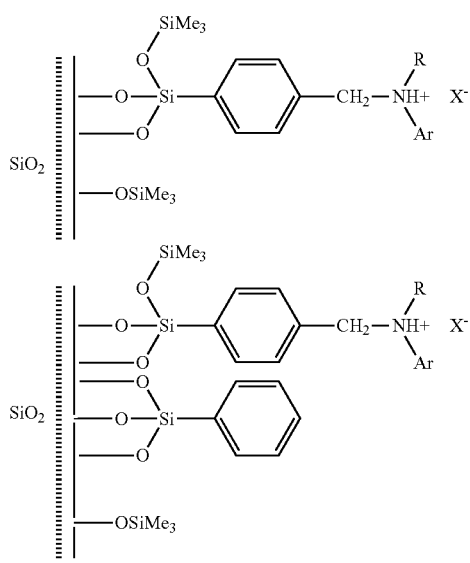

g) retrieving an activating support.

The present invention also discloses the activating supports obtainable by the method of the present invention.

These new activating supports are suitable for preparing catalyst systems based on single site catalyst components. Metallocene or late transition metal complex catalyst components prepared by any method known in the art can be deposited on the activating support of the present invention in order to provide active catalyst systems without addition of conventional activating agents such as aluminoxanes or boron-based compounds. Preferred metallocene catalyst components according to the present invention include compounds based on bridged bisindenyl, bistetrahydroindenyl or cyclopentadienyl-fluorenyl ligands. The metallocene catalyst component must be fully alkylated. Amongst the most preferred catalyst components, one can cite ethylene-bistetrahydroindenyl zirconium dimethyl, ethylene-(2-Me-4-t-But-cyclopentadienyl)(3-6,di-t-But-fluorenyl)zirconium dimethyl or ethylene-bis(2-Me,4-Ph-indenyl)zirconium dimethyl. Late transition metal complexes of the present invention preferably include α-diimine Ni complexes as disclosed by Brookhart in WO96/23010 or bis(imino)pyridyl Iron(II) or Cobalt(II) complexes as disclosed by Bristovsek et al. (G. J. P. Bristovsek, V. C. Gibson, B. S. Kimberley, P. J. Maddox, S. J. Mc Tavish, G. A. Solan, A. J. P. White, D. J. J. Williams, in Chem. Commun., 849-50, 1998) or in Small et al. (B. L. Small, M. Brookhart, A. M. A. Bennett, in J. Am. Chem. Soc., 120, 4049, 1998). Late transition components must also be fully alkylated. If not an alkylating agent such as aluninium alkyl must be added in order alkylate the compound.

The present invention thus discloses a method for preparing an active catalyst system by the steps of:
 a) providing an activating support as described hereabove;
 b) impregnating a fully alkylated metallocene or post-metallocene catalyst component onto the activating support;
 c) optionally adding a scavenger;
 d) retrieving an active catalyst system.

The scavenger is an aluminium alkyl. It is preferably selected from triisobutyl aluminium (TIBAL), triethylaluminium (TEAL) or trimethylaluminium.

The active catalyst systems of the present invention are used for the oligomerisation or the homo- or co-polymerisation of ethylene and alpha-olefins. They have the advantage of being very efficient without the need to add costly and dangerous material such as methylaluminoxane.

The present invention thus discloses a method for oligomerising or homo- or co-polymerising that comprises the steps of:
 a) injecting the active catalyst system of the present invention into the reactor;
 b) injecting the monomer and optional comonomer simultaneously with or after the catalyst system;
 c) optionally injecting a scavenger;
 d) maintaining under polymerization conditions;
 e) retrieving a polymer.

The monomer is preferably ethylene or propylene. The comonomer is preferably ethylene, propylene or 1-hexene.

EXAMPLES

The starting silica support used in all examples was from Grace Davison (GSH, Surface area: 513 m²·g⁻¹; porous volume: 1.8 mL·g⁻¹

Supported Ammonium

Example 1

Preparation of Sample (AE₁P-A/B) or Grafting paraaminophenyltrimethoxysilane on silica 5 g of Grace Davison were heated under vacuum at a temperature of 150° C. for 24 h. The first step was the anchoring of paraaminophenyltrimethoxysilane (4.43 g, 0.02 mol) on activated silica. It was carried out under toluene reflux (60° C. for 6 h and 120° C. for 1 h) and the reaction was catalysed by a ternary system consisting of water (373 μL), paratoluene sulfonic acid (195.88 mg) and ammonium fluoride (38.18 mg) in order to obtain a good and even surface coverage.

The textural properties of resulting hybrid material was analysed by nitrogen adsorption desorption ($S_{BET}$=296 m²/g). The amount of grafting organic was evaluated by TG analysis (4.18 10⁻³ mol/g).

The second step was the passivation of silanols: it was carried out by reaction of 6.43 g of the material obtained hereabove with 4.20 mL of trimethylsilylimidazole in 60 mL of toluene. The mixture was heated for a period of time of 16 h at a temperature of 60° C. After filtration, the material was washed several times with toluene, methanol and diethyl ether and then treated with soxhlet extractor for 16 hours. After heating for two hours, the material was analysed ($S_{BET}$=296 m²/g). The amount of grafting organic was evaluated by TG analysis (4.18 10⁻³ mol/g). $S_{BET}$: 231 m²/g. TGA: 1.86% ($H_2O$); 23.15% (organic part); 74.21% ($SiO_2$). The grafting of aromatic group and the passivation were evidenced by CP 13C NMR: 1.29 ($SiMe_3$), 115.33, 136.15, 148.85 (aromatic carbon).

The third step was the alkylation of primary amines: it was carried out by reaction of passivated material. 5.96 g were heated at a temperature of 150° C. under vacuum before use and methanol (40 mL) was added. After stirring for 5 mn, 36 g of paraformaldehyde (excess) were also added. The solution was heated for a period of time of 2 hours at a temperature of 65° C. The mixture was then cooled at 0° C. The addition of $NaBH_4$ (11 g) was performed. The reaction was very exothermic. After stirring for a period of time of 12 hours, the solution was hydrolysed by addition of ice, filtered and washed with methanol, toluene and diethylether. The material was treated with soxhlet to remove the physisorbed compounds. Lastly, the material was dried at a temperature of 60° C. for a period of time of 2 hours. The characteristics of the resulting material were as follows:

$S_{BET}$: 226 m²/g.

TG analysis: 3.86% ($H_2O$); 29.22% (organic moieties); 66.19% (Silica).

¹³C NMR: 1.21 ($SiMe_3$), 52.33 ($N(CH_3)_2$), 114.12, 135.67, 148.73 (aromatic carbons)

The fourth step was the quaternisation of the resulting tertiary amines by protonation with trifluoromethane sulfonic acid. To perform this reaction, 300 mg of prepared material were activated under vacuum at room temperature for 2 hours. Toluene (8 mL) was then added. The suspension was stirred for 10 mn and a solution of trifluoromethanesulfonic acid (150 μL diluted in 2 mL of toluene) was added. The mixture was stirred at room temperature for 24 hours. The solution was filtered, washed several times with toluene, and tetrahydrofurane (THF). The material was dried for 2 hours.

The fifth step was the introduction of the borate group: it was carried out by exchange reaction with $OSO_2CF_3$ (OTf) anion. Compound $B(C_6F_5)_4Li$ was synthetised by reacting $C_6F_5Li$ (138 μL, 1.26 mmol) with $B(C_6F_5)_3$ (0.65 g, 1.26 mmol). It was then reacted with $R_3N^+H$, ⁻OTf to form $R_3N^+H$, $B(C_6F_5)_4$ with release of LiOTf. The resulting material was analysed and had the following properties:

$S_{BET}$: 118 m²/g. ATG: 1.93% ($H_2O$); 37.06% (organic moieties); 60.59% ($SiO_2$).

¹³C NMR: 0.59 ($SiMe_3$); 48.23 ($HN(CH_3)_2$); 114.12, 135.67, 136.02, 137.72, 138.05, 139.68, 139.60, 147.95, 148.73 (aromatic carbons).

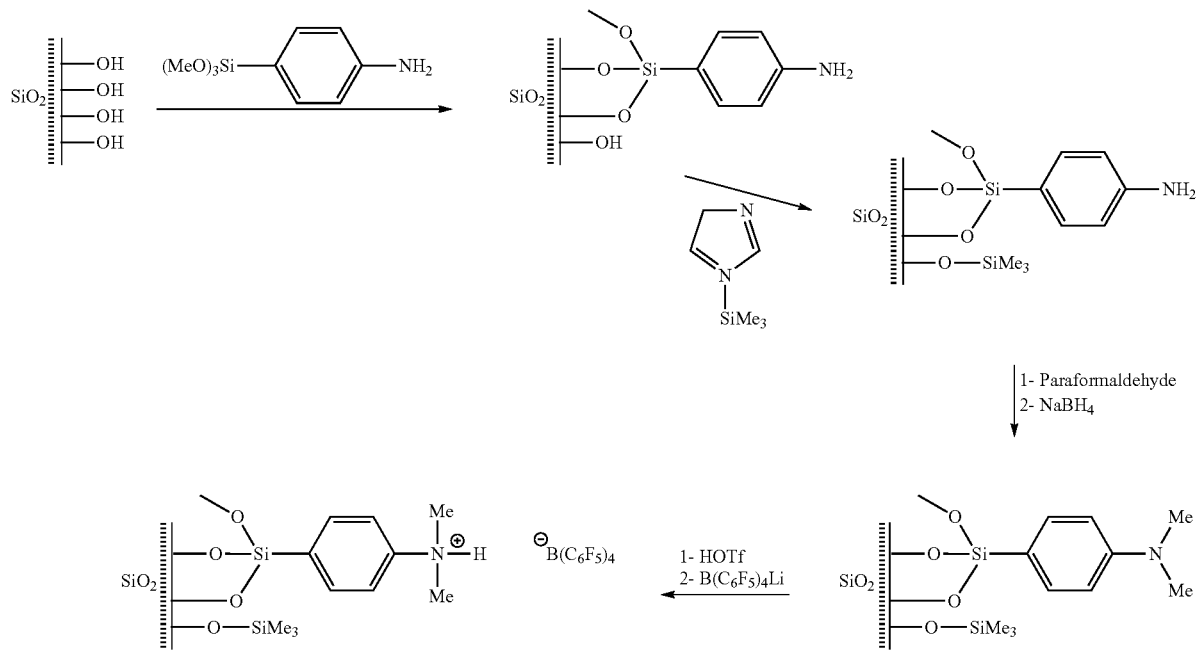

AE1P-A/B

Example 2

Preparation of Sample (AE₂P-A/B) or Grafting and Dispersing paraaminophenyltrimethoxysilane on silica The procedure was the same as that disclosed in example 1 except that in the first step, para-aminophenyltrimethoxysilane and phenyltrimethoxy silane were simultaneously added to the silica support in a ratio of 1 to 4 in order to separate the ammoniums.

AE2P-A/B

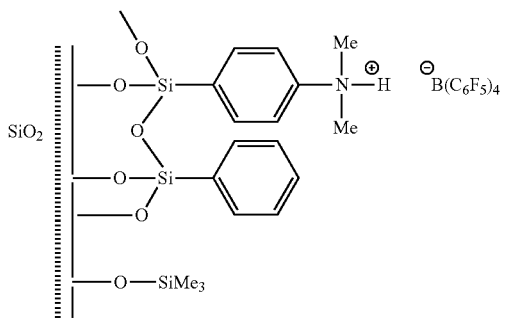

Example 3

Preparation of Sample (AE₃P-A/B) or Grafting and paramethylchlorophenyltrimethoxysilane on silica In the first step, starting from 5 g of Grace Davison silica support activated at 150° C. for 12 h, anchoring of parabenzyltrimethoxysilane chloride (4.48 mL, 0.019 mol) was carried out under toluene ((60° C. for 6 h and 120° C. for 1 h) and the reaction was catalysed by a ternary system consisting of water (373 μL), paratoluene sulfonic acid (195.88 mg) and ammonium fluoride (38.18 mg) in order to obtain a good and even surface coverage. The resulting material was then filtered and washed several times with toluene, methanol and diethylether. Finally, the material was dried at 100° C. for 2 h. The textural properties of resulting hybrid material were determined by nitrogen adsorption desorption ($S_{BET}$=413 m²/g). The amount of grafting organic was evaluated from TG analysis: 2.15% ($H_2O$); 20.84% (organic moieties); 77.01% ($SiO_2$).

In the second step, the silanols were passivated by reaction with N,O-bistrimethylsilyltrifluoroacetamide that was selected because it was not very nucleophile and thus not likely to initiate the substitution of chlorine. 5.75 g of the material prepared in the first step were heated at a temperature of 150° C. for a period of time of 16 h. 60 mL of toluene were then added. After stirring for 15 minutes, N,O-bis(trimethylsilyl)trifluoroacetamide (4.40 mL) was introduced dropwise as silylating agent. The mixture was heated at a temperature of 60° C. fo a period of time of 16 h. The solution was filtered and washed with toluene, methanol and diethylether. The material was treated with soxhlet extractor with 1:1 of dichloromethane: diethylether for 16 h. The solid was dried at a temperature of 100° C. for a period of time of 2 hours. The textural and structural analyses were then performed. The results were as follows:

$S_{BET}$: 368 m²/g. TG analysis: 0.97% ($H_2O$); 20.57% (organic moieties); 77.72%, ($SiO_2$).

¹³C NMR: 0.41 ($SiMe_3$), 43.87 ($CH_2Cl$), 127.50, 134.42 (aromatic carbon).

In the third step, N-methylaniline (5.4 mL) was first synthetised. It was then mixed with triethylamine (5.4 mL) and added to a suspension of activated chlorobenzene supported silica (5.44 g of activated support in 50 mL of toluene). The mixture was heated at a temperature of 80° C. for a period of time of 36 h. The nucleophilic reaction between secondary amine and chloride as leaving group resulted in the formation of the corresponding tertiary amine with elimination of HCl. The latter was then neutralised with triethylamine leading precipitation of chlorhydrate. The material was filtered and washed with toluene, methanol, dimethylformamide (to remove chlorhydrate from silica), pentane and diethylether. The solid was treated with soxhlet for 12 hours. The obtained material was dried at a temperature of 100° C. for a period of time of 2 hours and analysed. The results were as follows:

$S_{BET}$: 375 m²/g. TG analysis: 1.70% ($H_2O$); 22.35% (organic moieties); 75.24% ($SiO_2$).

In the fourth step, the tertiary amines were quaternised by protonation with trifluoromethane sulfonic acid (HOTf). To perform this reaction, the tertiary amino supported silica (1.5 g) was activated under vacuum at room temperature for 3 hours and toluene (20 mL) was then added. After stirring for 15 minutes, a solution of trifluoromethanesulfonic acid (0.45 mL) in 5 mL of toluene was added dropwise. The mixture was stirred for 24 hours at room temperature. The solution was filtered and washed with toluene and tetrahydrofurane. The material was then dried under vacuum for 4 hours.

In the fifth step, the introduction of the borate group was carried out exactly as in example 1.

AE3P-A/B

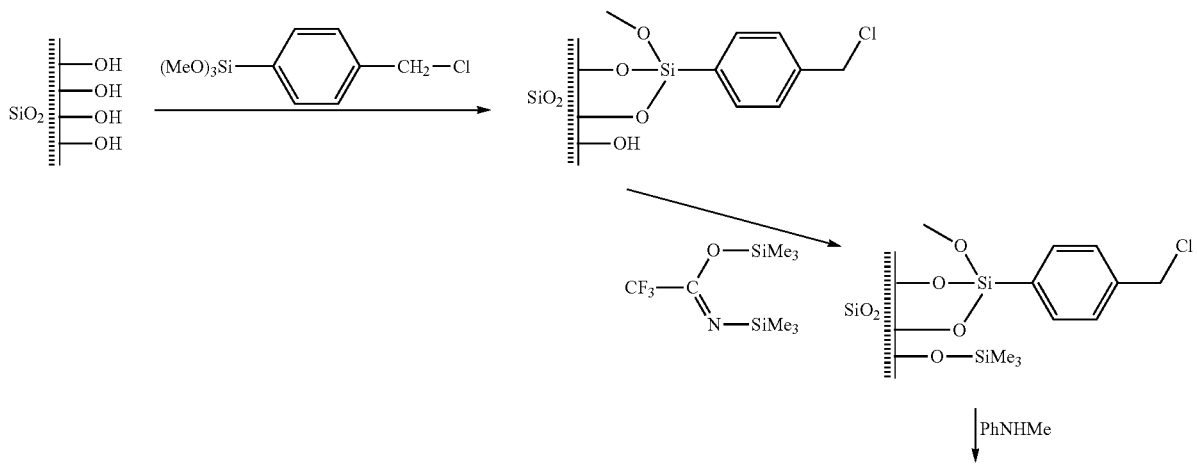

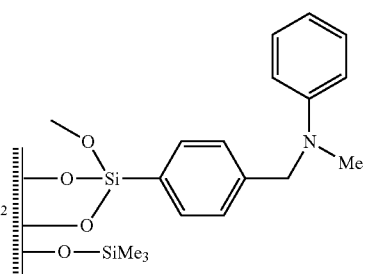

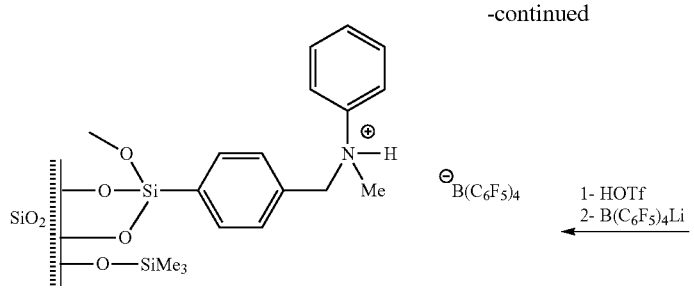

Example 4

Preparation of Sample (AE$_4$P-A/B) or Grafting and dispersing paramethylchlorophenyltrimethoxysilane on silica The procedure was the same as that disclosed in example 3 except that in the first step, paramethylchlorophenyltrimethoxysilane and phenyltrimethoxy silane were simultaneously added to the silica support in a ratio of 1 to 4 in order to further separate the ammoniums.

AE4P-A/B

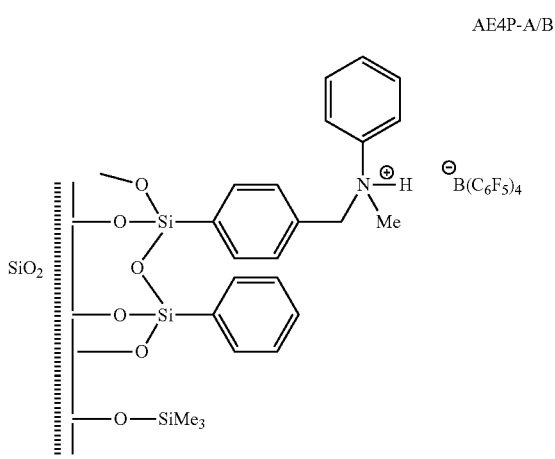

Polymerisation of Ethylene.

The activating supports of examples 1 to 4 were used to polymerise ethylene under the following conditions, using a metallocene complex:

Solvent: 20 ml of heptane
Scavenger: 1 mL of triisobutylaluminium (TIBAL)
Pressure: 15 bars of ethylene
Temperature: 50° C.
Polymerisation time: 30 minutes
Stirring was carried out at 1000 rpm.

The polymerization results are displayed in Table I.

TABLE I.

| Activating support | Ratio metal/activator | Productivity g/g/h | Activity Kg/mmol/h | Morphology |
|---|---|---|---|---|
| AE1P-A/B | 0.95 | 315 | 1.7 | No |
| AE2P-A/B | 3.75 | 259.4 | 1.6 | No |

TABLE I.-continued

| Activating support | Ratio metal/activator | Productivity g/g/h | Activity Kg/mmol/h | Morphology |
|---|---|---|---|---|
| AE3P-A/B | 1.79 | 281 | 1.7 | No |
| AE4P-A/B | 1.4 | 251 | 1.5 | No |

The invention claimed is:

1. A method for preparing an activating support that comprises the steps of:

a) providing a support prepared from silica or from mixed mineral oxides based on silica;

b) grafting on the surface of the support of step a) a mixture of silylating agents comprising a functionalised silylating agent of formula Y$_3$Si-L-NR'$_2$ wherein each R' is independently selected from alkyl, aryl, alkylaryl or alkylaryl, and a structurally similar non functionalised silylating agent Y$_3$Si-L to provide a modified support, said functionalised and non functionalised silylating agents being in a ratio ranging between 1:1 and 1:19 and wherein each Y is independently selected from alkoxy, halogen or hydrogen, L is a phenyl group

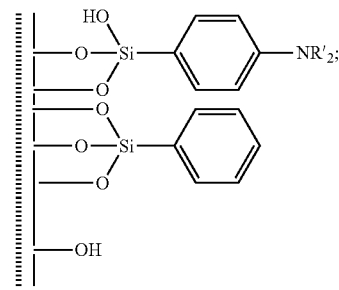

c) adding to the intermediate support of step b) a non-nucleophile trimethylsilylating agent selected from the group consisting of trimethylphenoxysilane, hexamethyldisiloxane, trimethylsilyl methanesulfonate, trimethylsilyl trifluoromethanesulfonate, trimethylsilyl-p-toluenesulfonate, hexamethyldisilazane, N,N-bis(trimethylsilyl)urea, N,O-bis(trimethylsilyl)acetamide, N-trimethylsilyl acetamide, N-methyl-N-trimethylsilyl-trifluoroacetamide, N-trimethylsilylimidazole, N-trimethylsilylthiazole, N-trimethylsilyloxazole and a trialkylhalogensilane to form an intermediate support:

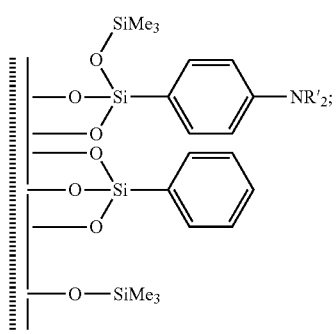

d) protonating the intermediate support of step c) with an acid AH in order to form a protonated intermediate support:

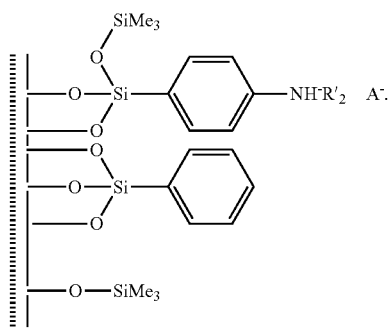

wherein A is triflate $CF_3SO_2O$ (OTf) or halogen;

e) adding a borate or aluminate XM to the protonated intermediate support of step d) wherein X is Al- or B-containing activating group and M is a metal Group 1 of the Periodic Table, to form an activating support:

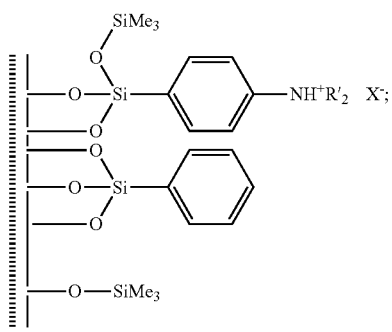

and f) retrieving the activating support.

2. A method for preparing an activating support that comprises the steps of:

a) providing a support prepared from silica or from mixed mineral oxides based on silica;

b) grafting on the surface of the support of step a) a mixture of silylating agents comprising a functionalised silylating agent of formula $Y_3Si$-L-$CH_2$—Z and a structurally similar non functionalised silylating agent $Y_3Si$-L, said functionalised and non functionalised silylating agents being in a ratio ranging between 1:1 and 1:19 and wherein each Y is independently selected from alkoxy, halogen or hydrogen, L is a rigid linking group and Z is a leaving group in order to prepare a modified support:

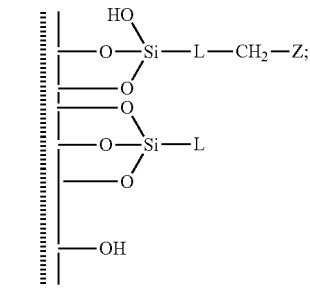

c) adding to the modified support of step b) a non-nucleophile trimethylsilylating agent selected from the group consisting of trimethylphenoxysilane, hexamethyldisiloxane, trimethylsilyl methanesulfonate, trimethylsilyl trifluoromethanesulfonate, trimethylsilyl-p-toluenesulfonate, hexamethyldisilazane, N,N-bis(trimethylsilyl)urea, N,O-bis(trimethylsilyl)acetamide, N-trimethylsilyl acetamide, N-methyl-N-trimethylsilyltrifluoroacetamide, N-trimethylsilylimidazole, N-trimethylsilylthiazole, N-trimethylsilyloxazole and trialkylhalogensilane to form an intermediate support:

with release of $CF_3$—$C(O)NH_2$ and wherein the amount of trimethylsilylating agent is selected to provide at least 5 equivalents of silanol with respect to silanol present in the starting silica-based support of step a);

d) adding to the intermediate support of step c) a secondary amine of formula:

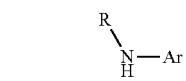

wherein R is alkyl group having from 1 to 6 carbon atoms or substituted or unsubstituted aryl group and Ar is substituted or unsubstituted aryl group in order to provide an amine-grafted intermediate support:

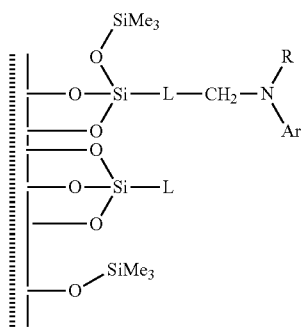

e) protonating the intermediate amine-grafted supports of step d) with acid AH in order to form a protonated intermediate support:

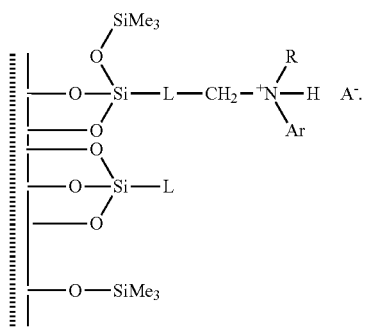

3. The method of claim 2 wherein leaving group A is selected from halogen, paratoluenesulfonate, triflate or diazonium.

4. The method of claim 1 wherein X is selected from tetrakis-(pentafluoroarly)borate or tetrakis-(pentafluoroaryl)aluminate.

5. The method of claim 1 wherein M is lithium.

6. The method of claim 1 wherein the support is selected from $SiO_2$, $SiO_2/Al_2O_3$, $SiO_2/TiO_2$, $SiO_2/ZrO_2$, or $SiO_2/LnO_x$ wherein Ln stands for lanthanides.

7. The method of claim 1 wherein the non-nucleophile trimethylsilylating agent is N,O-bis(trimethylsilyl)trifluoroacetamide.

8. An activating support obtained by the method of claim 1.

9. An active catalyst system comprising the activating support of claim 8 and one or more metallocenes.

10. A method for preparing the active catalyst system of claim 9 that comprises the steps of: a) providing the activating support of claim 1; b) impregnating a fully alkylated metallocene onto the activating support; c) optionally adding a scavenger; d) retrieving an active catalyst system.

11. The method of claim 10 wherein the scavenger is aluminium alkyl selected from trimethyl aluminium, triethyl aluminium or triisoutyl aluminium.

12. A method for oligomerising or homo- or co-polymerising ethylene and alpha-olefins that comprises the steps of a) injecting the active catalyst system of claim 8 into the reactor; b) injecting the monomer and optional comonomer simultaneously with or after the catalyst system; c) optionally injecting a scavenger; d) maintaining under polymerisation conditions; e) retrieving a polymer.

13. The method of claim 12 wherein the monomer is ethylene or propylene and the comonomer, if present, is ethylene, propylene or 1-hexene.

* * * * *